US012000194B2

(12) United States Patent
Paulsson

(10) Patent No.: US 12,000,194 B2
(45) Date of Patent: Jun. 4, 2024

(54) DOOR OPERATOR FOR AN OVERHEAD DOOR SYSTEM AND A METHOD FOR CONTROLING A DOOR OPERATOR

(71) Applicant: Assa Abloy Entrance Systems AB, Landskrona (SE)

(72) Inventor: Stefan Paulsson, Odakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 101 days.

(21) Appl. No.: 17/422,907

(22) PCT Filed: Jan. 28, 2020

(86) PCT No.: PCT/EP2020/051964
§ 371 (c)(1),
(2) Date: Jul. 14, 2021

(87) PCT Pub. No.: WO2020/157023
PCT Pub. Date: Aug. 6, 2020

(65) Prior Publication Data

US 2022/0120128 A1 Apr. 21, 2022

(30) Foreign Application Priority Data

Jan. 30, 2019 (SE) .................................... 1930030-0

(51) Int. Cl.
*E05F 15/668* (2015.01)

(52) U.S. Cl.
CPC ....... *E05F 15/668* (2015.01); *E05Y 2201/434* (2013.01); *E05Y 2201/72* (2013.01);
(Continued)

(58) Field of Classification Search
CPC ............... E05F 15/668; E05Y 2201/72; E05Y 2400/356; B60K 1/02; F16H 37/08
(Continued)

(56) References Cited

U.S. PATENT DOCUMENTS 4,019,596 A * 4/1977 Crull .................... B62D 11/183
180/6.48
5,628,234 A * 5/1997 Crook ..................... F16H 37/08
475/221

(Continued)

FOREIGN PATENT DOCUMENTS

AU 1621497 9/1997
AU 2010100034 2/2010

(Continued)

OTHER PUBLICATIONS

English translation of German Patent DE 742165 from Espacenet (Year: 1943).*

(Continued)

*Primary Examiner* — Janet M Wilkens
*Assistant Examiner* — Susan M. Heschel
(74) *Attorney, Agent, or Firm* — Wissing Miller LLP

(57) ABSTRACT

Door operator (10) for an overhead door system (400), said door operator (10) being configured to move a door (401) of said door system (400), comprising: a first electric motor (100), a second electric motor (200), a planetary gearing (300), a control unit (11) configured to control the first (100) and second electric motor (200), and wherein the first electric motor (100) is connected to a first planetary gearing input shaft (301) and the second electric motor (200) is connected to a second planetary gearing input shaft (302), and wherein a planetary gearing output shaft (303) is associated with a shaft (402) for movement of the door (401).

14 Claims, 2 Drawing Sheets

(52) U.S. Cl.
CPC ..... *E05Y 2400/356* (2013.01); *E05Y 2400/36* (2013.01); *E05Y 2900/106* (2013.01)

(58) Field of Classification Search
USPC .................................................... 49/197, 199
See application file for complete search history.

(56) References Cited

U.S. PATENT DOCUMENTS

| | | | | |
|---|---|---|---|---|
| 8,458,956 | B2 * | 6/2013 | Hoermann ............ | E05F 15/668 49/199 |
| 2010/0258254 | A1 | 10/2010 | Lumbers et al. | |

FOREIGN PATENT DOCUMENTS

| | | | |
|---|---|---|---|
| DE | 742165 | | 11/1943 |
| DE | 742165 | C * | 11/1943 |
| EP | 2960420 | | 12/2015 |
| FR | 587967 | | 4/1925 |
| IT | 20100043 | | 10/2011 |

OTHER PUBLICATIONS

International Search Report in PCT/EP2020/051964, dated Apr. 21, 2020.
Swedish Search Report in 1930030-0, dated Aug. 30, 2019.
Indian Search Report in 202147038500, dated Feb. 1, 2023.

* cited by examiner

DOOR OPERATOR FOR AN OVERHEAD DOOR SYSTEM AND A METHOD FOR CONTROLING A DOOR OPERATOR

This application is a 371 of PCT/EP2020/051964 filed on Jan. 28, 2020, published on Aug. 6, 2020 under publication number WO 2020/157023, which claims priority benefits from Swedish Patent Application No. 1930030-0, filed on Jan. 30, 2019, the disclosure of which is incorporated herein by reference.

TECHNICAL FIELD

The present invention relates to the technical field of door operators, specifically for overhead door systems, to an overhead door system comprising a door operator and to a method for controlling a door operator.

PRIOR ART

Automated doors, especially overhead doors, are commonly used entrance systems in many different applications, providing reliable operation without taking up valuable floor space. The doors are often comprised of several laterally extending sections, i.e. the door may be a sectional door, that are hinged in relation to each other. The door can thus attain a curved shape by the hinging of the door sections, facilitating opening and closing motion of the door.

Overhead door systems usually rely on tracks on each side of the door, which guide the door as it moves from a closed position to an open position. For this purpose are the door sections often provided with rollers in engagement with the tracks, reducing friction as well as noise and vibrations emitted from the system. Usually is the door arranged vertically when closed, while most, if not all, of the sections of the door are arranged horizontally or inclined when the door is open.

A door operator based on an electric motor is often provided, which connects to the door via linkage or a wire, belt, chain or similar. The motor thereby controls the motion of the door in response to operator input or similar. Many systems combine the electric motor with a balancing spring, which alleviates some of the load from the electric motor during certain operating conditions. This reduces the need for a stronger motor, since the spring may provide additional lifting force when required.

It is desired to provide an automated door system, especially for overhead sectional doors, that reduces the time required for opening and closing of the door. It is also desired to provide a door operator that allows control of the speed of the opening/closing of the door.

SUMMARY

It is therefore an object of the invention to at least partly overcome one or more of the above-identified limitations of the prior art. In particular, it is an object to provide a door operator for an overhead door system. The door operator is configured to move a door of said door system. Accordingly, the door operator may be configured to lift the door of said door system. The door operator comprises a first electric motor, a second electric motor, a planetary gearing. A control unit is provided being configured to control the first and second electric motor. The first electric motor is connected to a first planetary gearing input shaft and the second electric motor is connected to a second planetary gearing input shaft, wherein a planetary gearing output shaft is associated with a shaft for movement of the door 401. The door operator is further configured to, by control of the rotation of the first and second planetary gearing input shafts, to control the planetary gearing gear ratio and thus the angular velocity and the torque delivered by the planetary gearing output shaft. By the control of the rotation, both the relative and actual rotation, of the input shafts, takin into account the particular planetary gearing to which they connect, the door operator may seamlessly alter the gear ratio between the motors and the output shaft from the planetary gearing. This provides a decrease in the time it takes for the door to open and/or close, while avoiding uneven motion of the door and/or rapid accelerations/decelerations that could affect the durability of the door system/door operator as well as providing the torque necessary to lift/lower the door in a safe and robust manner throughout the entire opening and closing sequence. Another beneficial effect is that smaller electric motors can be used, as the power output/torque from the motors is combined by the shared planetary gearing, giving cost and reliability benefits. Furthermore, the combination of the dual motors with the shared planetary gearing provides improved braking characteristics when the door operator is used to slow the speed of the door during an opening or closing sequence. Hence, the braking functionality provided by the planetary gearing may be utilized instead of providing the overhead door system with additional components, such as mechanical springs, for providing the required braking torque.

The second planetary gearing input shaft may be connected to a ring gear of the planetary gearing.

Furthermore, the first planetary gearing input shaft may be connected to a planet carrier of the planetary gearing.

In one embodiment, the planetary gearing output shaft is connected to a sun gear of the planetary gearing.

The second planetary gearing input shaft may extend inside the door shaft, and the planetary gearing may be arranged between the first and second electric motors.

The door operator may be configured to be mounted as a unit on one side of the door.

In one embodiment, the door operator is configured to be mounted with the first electric motor and the planetary gearing on one side of the door and the second electric motor on the other side of the door. In some application the wall space next to the door on side may be limited, by dividing the electric motors can the door operator be made smaller to facilitate mounting of the door operator in such situations.

In a second aspect is an overhead door system provided comprising a door being moveable between an open and a closed position by means of a door operator according to the first aspect. Hence, the overhead door system may comprise the door operator according to the first aspect. The door system can thereby achieve decreased opening/closing times, which is beneficial for the indoor climate as escape of heated or cooled air during the time that the door is open can be reduced.

In a third aspect is a method for controlling a door operator of an overhead door system of the second aspect provided. The method comprises receiving an activation request of the door operator, i.e. a signal indication a desired movement of the door such as an opening movement, a closing movement. The method further comprises determining based on current operating conditions an operating mode of the door operator and controlling the rotation of the first and second planetary gearing input shafts based on the determined operating mode. The movement of the door can thus be adapted to operating conditions of the door, the door operator automatically setting the correct operating mode for a given operating condition. E.g. when the door is closed and opening of the door is requested, the operating mode may dictate a slow start with high torque output from the output shaft of the door operator. On the other hand, when the door is moving between its end positions, the door operator may be configured to transfer to an operating mode which increases the speed of the door movement.

In one embodiment, the method comprises a first operating mode comprising rotating the first and second planetary gearing input shafts in the same direction and with essentially the same speed. The method may further comprise a second operating mode comprising holding one of the first and second planetary gearing input shafts stationary while the other planetary gearing input shaft rotates. The method may furthermore comprise a third operating mode comprising rotating the first and second planetary gearing input shafts in the opposite direction in relation to one another.

The operating conditions may comprises the current position of the door and/or the desired movement direction of the door and/or the velocity of the door and/or the load on the output shaft. The door operator can thus determine based on one or several of the above operating conditions a preferred operating mode of the door operator. For instance, if a high load is determined, e.g. by an increase in the voltage or amperage required for the electric motors to achieve a certain speed, the door operator can be set in a mode providing low speed and high torque from the planetary gearing output shaft.

In one embodiment, the first operating mode is used to provide a high torque and slow speed, and the second operating mode is used to provide an intermediate speed and the third mode to achieve a highest speed. The third mode may be used to provide a high speed and low torque. The speed of the door in the first mode is slower than in the second mode and the speed of the door in the third mode is higher than in the second mode. Accordingly, the torque provided to the door in the first mode is higher than in the second mode and the torque provided in the second mode is higher than in the third mode.

In one embodiment, the first operating mode is used when the door is in the proximity of an end position providing high torque and slow speed, and the second operating mode is used to provide an intermediate speed and the third mode to achieve a highest speed between the door end positions. High torque is required during high loads, and the way that most overhead door systems are configured, the loads are the highest on the door operator when the door is in its closed position and an opening sequence is initiated. High torque output from the door operator is thus desired at such an operating condition, and while the load gradually decreases on the door operator as the door opens may the door operator go from high torque low speed mode to a high speed low torque mode in a gradual manner.

In one embodiment, the first to third operating modes are used during an opening sequence of the door. The first mode is used to initiate the opening of the door when the door is in its vertical and closed end position, the second mode is used as an intermediate mode to accelerate the door once partially open, and the third mode is used to achieve a high opening speed of the door when the door has attained sufficient speed in the second mode.

Further still, the door operator may be configured to slow the opening sequence once the door approaches its open horizontal end position by going from the third mode, to the second mode and to the first mode.

Embodiments of the invention are defined by the appended dependent claims and are further explained in the detailed description section as well as in the drawings.

It should be emphasized that the term “comprises/comprising” when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to “a/an/the [element, device, component, means, step, etc]” are to be interpreted openly as referring to at least one instance of the element, device, component, means, step, etc., unless explicitly stated otherwise. The steps of any method disclosed herein do not have to be performed in the exact order disclosed, unless explicitly state.

BRIEF DESCRIPTION OF THE DRAWINGS

The present invention will be described further below by way of example and with reference to the enclosed drawings. In the drawings.

DETAILED DESCRIPTION OF EMBODIMENTS

Figure 1:
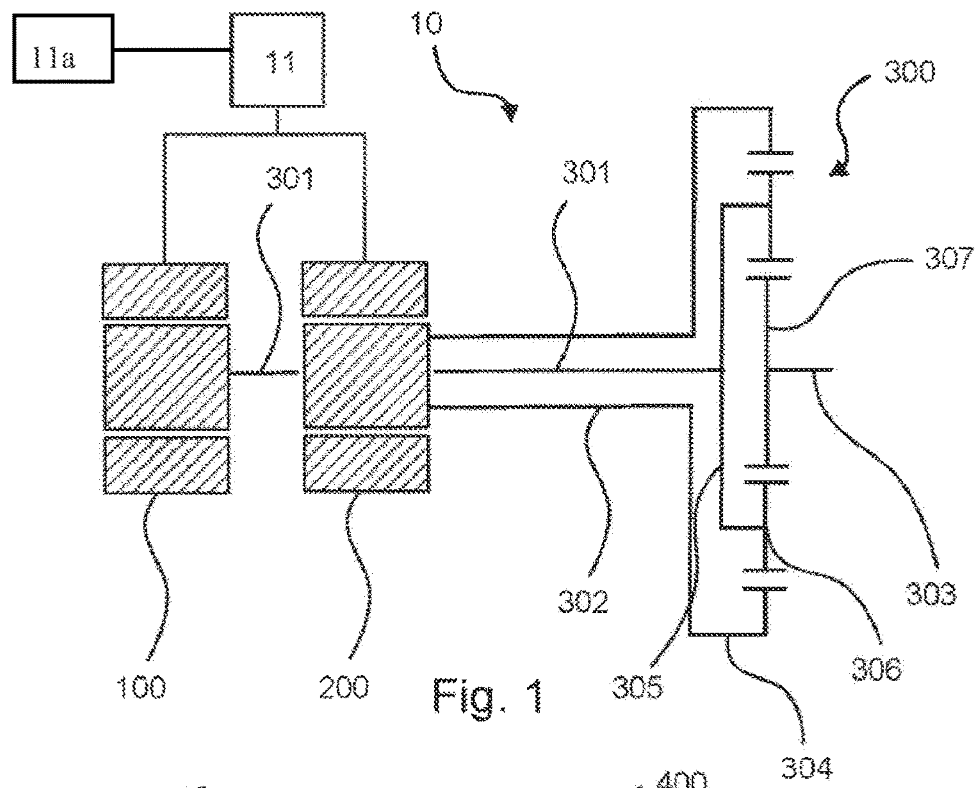
FIG. 1 shows a schematic outline of a door operator according to one embodiment.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 shows a schematic outline of a door operator 10 for an overhead door system 400. The door operator 10 is configured to be used with preferably industrial overhead door systems, but it may be applicable also to other similar door systems. The door 401 may in a preferred embodiment be a sectional door, and as the term implies, is thus partitioned into a number of sections 403. Each section 403 is hinged to the adjacent section(s) and the sections 403 generally extends horizontally/laterally from one side of the door 401 to the other. The door 401 can thus be shaped during the opening/closing by pivoting the sections 403 around the hinging between them. This allows the door 401 to be guided and formed in its motion by a bent track, which transfers the door 401 from an essentially vertical closed position to a horizontal or inclined open position. For the purpose of guiding the door 401 along the track in a smooth and low-friction manner, each section 401 is preferably provided with laterally arranged rollers which are in engagement with the tracks.

When the door 401 is in a closed vertical position, and opening of the door 401 is initiated, the load of the door operator 10 is the heaviest as the door operator 10 needs lift the entire door 401. On the other hand, when the door 401 travels along the horizontal or inclined portion of the tracks, the load on the door operator 10 is significantly less. It is desired that the door operator 10 can accommodate such varying operating conditions. Further still, when an opening or closing motion of the door is initiated or when the door 401 approaches either end position (i.e. a fully closed or fully open position), the acceleration/deceleration should preferably be relatively smooth in order to avoid unnecessary wear or strain on the door operator 10.

The door operator 10 shown in FIG. 1 comprises a first electric motor 100 and a second electric motor 200. The electric motors 100 may comprise integrated frequency inverters and encoders/sensors for determining a position of the door 401 associated with the door operator 10. Furthermore, the electric motors 100, 200 may be arranged in a master-slave configuration, where either the first electric motor 100 or the second electric motor 200 follows the other electric motor.

The door operator further comprises a planetary gearing 300, preferably comprising a sun gear 307, a number of planet gears 306 arranged on a planet carrier 305 and a ring gear 304.

In order to control the electric motors 100, 200 is a control unit 11 provided. The control unit is operatively connected to the electric motors 100, 200. The control unit may be constituted by any suitable central processing unit CPU, microcontroller, Digital Signal Processor DSP, etc., capable of executing computer program code. The control unit 11 may be implemented using instructions that enable hardware functionality, for example, by using executable computer program instructions in a general-purpose or special-purpose processor that may be stored on a computer readable storage medium (disk, memory etc.) to be executed by such a processor. The control unit 11 may be implemented using any suitable, publically available processor or Programmable Logic Circuit (PLC). The control unit 11 may further receive signals from sensor(s) indicating an operating condition of the door 401, such as a position of the door 401, for instance from the electric motors 100, 200 or from external sensors such as infrared sensors or switches indicating a position of the door 401.

The first electric motor is connected to a first planetary gearing input shaft 301 and the second electric motor 200 is connected to a second planetary gearing input shaft 302. The electric motors 100, 200 are shown as having their respective rotors being directly coupled to the input shafts 301, 302. It is however to be understood that the electric motors 100, 200 could just as well be connected to their respective input shafts 301, 302 via a gearing such that they may be arranged non-coaxially with the planetary gearing 300. Such a gearing may optionally also provide a gear ratio other between the input shafts 301, 302 and the respective electric motor 100, 200 being other than 1.

A planetary gearing output shaft 303 is further provided, the output shaft 303 being associated with a shaft 402 for movement of the door 401. The shaft 402 for moving the door 401 may be a torsion shaft 402 which comprises drums 404 onto which wires (not shown) are wound and which are attached to the door 401 for achieving movement thereof. The output shaft 303 may be associated with the shaft 402 for moving the door 401 directly, or via an additional gearing.

The door operator 10 is configured to, by control of the rotation of the first and second planetary gearing input shafts 301, 302, to control the planetary gearing 300 gear ratio and thus the angular velocity and the torque delivered by the planetary gearing output shaft 303. The door operator 10 can thus combine the two electric motors 100, 200, into a single output shaft 303 and achieve a desired opening/closing speed of the door 401 by controlling the relative rotation of the input shafts 301, 302 by means of the electric motors 100, 200. The load on the respective electric motor 100, 200 is thus reduced, and each electric motor 100, 200 can have a lower power output than that of a conventional door operator. Further still, the desired door opening/closing speed can be achieved without having to use a conventional gearbox.

Further, during the closing motion of the door 401, it may suffice to simply allow the door 401 to move under its own weight at least when a certain number of door sections 403 have reached the vertical section of the track. The electric motors 100, 200 may then provide a braking force, to prevent that the door 401 moves to rapidly. The combination of two electric motors 100, 200 and the planetary gearing 300 for this purpose provides improved braking characteristics, as the gear ratio of the planetary gearing 300 along with the dual motor configuration of the door operator 10 reduces the load on the individual motors 100, 200 during braking of the door 401. The closing sequence may comprise the electric motors 100, 200 driving the door 401 during the horizontal/inclined portion of the track until sufficient door sections 402 are arranged vertically, upon which the electric motors 100, 200 instead brakes the motion of the door 401.

The second planetary gearing input shaft 302 may be connected to a ring gear 304 of the planetary gearing 300, and the first planetary gearing input shaft 301 may be connected to a planet carrier 305 of the planetary gearing 300. The planetary gearing output shaft 303 may further be connected to the sun gear 307 of the planetary gearing 300. The above arrangement allows the door operator 10 to achieve three operation modes for driving the output shaft 303, as well as gradual transitions between the three modes, depending on the relative rotation of the first and second input shafts 301, 302. These will be discussed further in relation to FIG. 3.

The first input shaft 301, as is shown in FIG. 1, may extend inside of the second input shaft 302, with both of the electric motors 100, 200 being arranged on one side of the planetary gearing 300. In another embodiment, the second planetary gearing input shaft 302 extends inside the door shaft 402, such that the planetary gearing 300 is arranged between the first and second electric motors 100, 200. This allows the door operator 10 to be mounted either as a unit on one side of the door 401, when conditions such as available space on the wall allows this. In another embodiment, the door operator 10 can be made smaller by mounting the first electric motor 100 and the planetary gearing 300 on one side of the door 401 while the second electric motor 200 is mounted on the other side of the door 401. This may give more flexibility in applications where wall space next to the door 401 is limited. The first and second electric motors are mounted to the same side of a wall forming a door opening covered by the door in its closed position.

Figure 2:
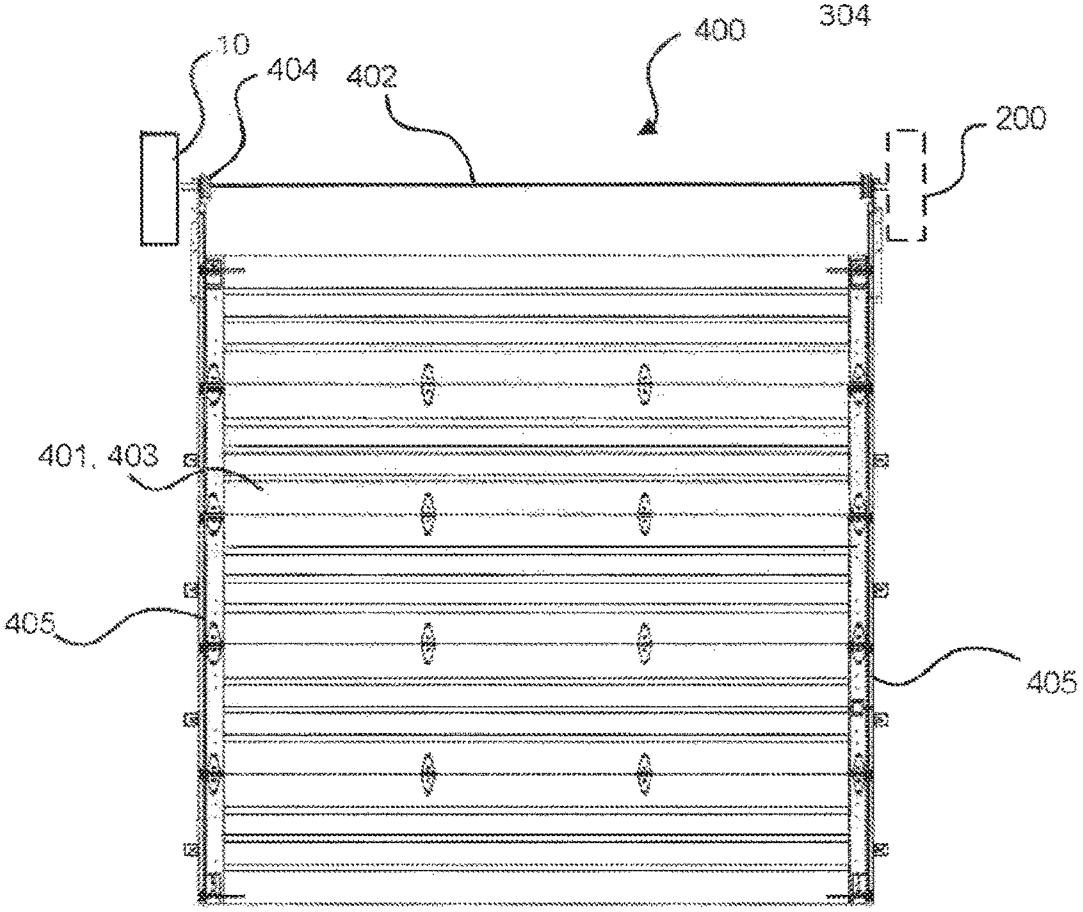
FIG. 2 shows an overhead sectional door system according to one embodiment.

In FIG. 2 is an overhead sectional door system 400 shown. The system 400 comprises a door 401 mounted on tracks 405, the door 401 being partitioned into sections 403. The door system 400 comprises a door operator 10 connected to a door shaft 402, such that it upon rotation winds a wire attached to the door 401 onto drums 404 and thus achieves an opening or closing motion of the door 401. The shaft 402 may also connect to the door 401 by a linkage, via gears or via a chain etc. In FIG. 2, an optional position of the second electric motor 200 is shown. This positioning of the second electric motor 200 is connected to the embodiment mentioned above, where the second planetary gearing input shaft 302 extends inside the door shaft 402, such that the planetary gearing 300 is arranged between the first and second electric motors 100, 200.

Figure 3:
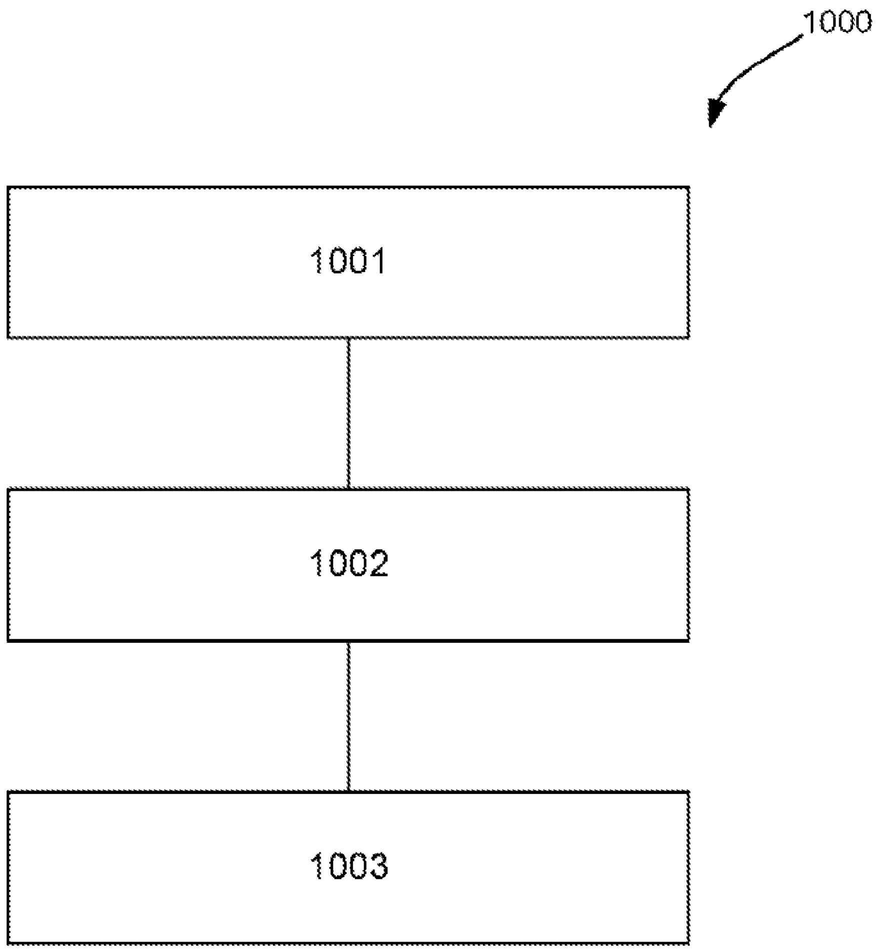
FIG. 3 shows a schematic flowchart of a method for controlling a door operator according to one embodiment.

Turning now to FIG. 3, showing a method 1000 for controlling a door operator 10 for movement of a door 401 of an overhead door system 400. The method 1000 comprises receiving 1001 an activation request of the door operator 10. The activation request could be a user pushing a button 11*a* for opening/closing the door 401. Button 11*a* could also be a sensor detecting a person or vehicle that is approaching, thus being a que for opening the door 401.

The door operator 10 subsequently determines 1002 based on current operating conditions an operating mode of the door operator 10. The operating conditions may include the current position of the door 401 and/or the desired movement direction of the door 401 and/or the velocity of the door 401 and/or the load on the output shaft 303.

The rotation of the first and second planetary gearing input shafts 301, 302 can subsequently be controlled 1003 based on the determined operating mode.

The operating modes are defined by the relative and actual rotation/speed of the first and second input shafts 301, 302, which is determined by the rotation of the electric motors 100, 200. A first operating mode may comprise rotating the first and second planetary gearing input shafts 301, 302 in the same direction and with essentially the same speed. The first mode will thus, in the embodiment shown in FIG. 1, lock the ring gear 304 and the planet carrier 305 so that they rotate with essentially the same speed and direction. This results in that the output shaft 303 will rotate with the same speed as the input shafts 301, 302, which preferably corresponds to the angular velocity of the electric motors 100, 200. The first mode thus provides a high torque and low speed/gear ratio and is beneficially used in the beginning of an opening sequence/motion and/or of a closing sequence/motion of the door 401 or during high load conditions.

A second operating mode may comprise holding one of the first and second planetary gearing input shafts 301, 302 stationary, while the other planetary gearing input shaft 301, 302 rotates. The second operating mode provides an increased speed in relation to the first mode, giving half of the maximum speed output from the output shaft 303 for a given angular velocity of the input shafts 301, 302. This mode is preferably used as an intermediate mode for accelerating/decelerating the door 401 between the first mode and a third mode which will be described below.

The third operating mode may comprise rotating the first and second planetary gearing input shafts 301, 302 in the opposite direction in relation to one another. This gives a maximum speed of the planetary gearing output shaft 303 for a given input shaft 301, 302 speed, by an increase in the total gear ratio of the planetary gearing 300. This mode is beneficially used when the door 401 is between its end positions, giving a high speed of the opening/closing motion. During the third operating mode, the speed of the output shaft 303 can be calculated by the following formula:

$$V_{output\ shaft(303)}=V_{first\ input\ shaft(301)}\times R+V_{second\ input\ shaft(302)}\times R \quad (1)$$

V=angular velocity/RPM

R=Gear ratio between the ring gear 304 and the sun gear 307.

By controlling the planetary gearing 300 using the electric motors 100, 200 which are connected to the input shafts 301, 302, the transitions between the different modes can also be made in a smooth manner. For instance, when the door operator 10, or the control unit 11 thereof, determines that it is time to go from the first mode to the second mode, the control unit 11 may gradually increase the speed of the first or the second input shaft 301, 302 until a desired door movement velocity or gear ratio of the planetary gearing 300 is achieved.

In one embodiment, the three modes above are used during the opening movement of the door 401, while the door operator 10 is used to provide a braking force to the door 401 during a closing movement of the door. Further still, the door operator 10 may be configured to slow the opening sequence once the door 401 approaches its open horizontal end position by going from the third mode, to the second mode and to the first mode. The first mode not only slows the door 401 down and increases the torque output from the door operator 10, it also increases the accuracy and may thus improve the control of the door 401 during the final stages of an opening or closing sequence. The braking force applied by the door operator 10 is preferably such that the closing movement essentially corresponds to the opening movement of the door 401.

It should be mentioned that the inventive concept is by no means limited to the embodiments described herein, and several modifications are feasible without departing from the scope of the appended claims. In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. Door operator for an overhead door system, said door operator being configured to move a door of said door system, the door operator comprising:

a first electric motor, a second electric motor, a planetary gearing, a control unit configured to control the first and second electric motor, and wherein the first electric motor is connected to a first planetary gearing input shaft and the second electric motor is connected to a second planetary gearing input shaft, wherein the planetary gearing comprises a planetary gearing output shaft, wherein the first planetary gearing input shaft is coaxial with the second planetary gearing input shaft, wherein the first and second planetary gearing input shafts are coaxial with the planetary gearing output shaft, and wherein the planetary gearing output shaft is associated with a door shaft for movement of the door, and wherein the door operator is configured to, by control of rotations of the first and second planetary gearing input shafts, to control the planetary gearing gear ratio and thus an angular velocity and a torque delivered by the planetary gearing output shaft.

2. Door operator according to claim 1, wherein the second planetary gearing input shaft is connected to a ring gear of the planetary gearing.

3. Door operator according to claim 1, wherein the first planetary gearing input shaft is connected to a planet carrier of the planetary gearing.

4. Door operator according to claim 1, wherein the planetary gearing output shaft is connected to a sun gear of the planetary gearing.

5. Door operator according to claim 1, wherein the door operator is configured to be mounted as a unit on one side of the door.

6. A method for controlling the door operator of an overhead door system according to claim 5 for achieving movement of the door, wherein the method comprises:

receiving an activation request by the control unit, determining, by the control unit based on current operating conditions, an operating mode of the door operator, controlling, by the control unit energizing the first and second motors, the rotation of the first and second planetary gearing input shafts based on the determined operating mode.

7. The method for controlling the door operator according to claim 6, wherein a first operating mode comprises rotating the first and second planetary gearing input shafts in the same direction and with essentially the same speed, a second operating mode comprises holding one of the first and second planetary gearing input shafts stationary while another of the first and second planetary gearing input shafts rotates, and a third operating mode comprises rotating the first and second planetary gearing input shafts in the opposite direction in relation to one another.

8. The method for controlling the door operator according to claim 7, wherein the operating conditions comprises a current position of the door, a desired movement direction of the door, a velocity of the door, or a load on the output shaft.

9. The method for controlling the door operator according to claim 8, wherein the first operating mode is used to provide a high torque and slow speed, and the second operating mode is used to provide an intermediate speed and the third mode to achieve a highest speed.

10. A method for controlling a door operator for an overhead door system, the door operator being configured to move a door of the door system, wherein the door operator comprises:

a first electric motor, a second electric motor, a planetary gearing, a control unit configured to control the first and second electric motor, and wherein the first electric motor is connected to a first planetary gearing input shaft and the second electric motor is connected to a second planetary gearing input shaft, wherein the planetary gearing comprises a planetary gearing output shaft, wherein the first planetary gearing input shaft is coaxial with the second planetary gearing input shaft, wherein the first and second planetary gearing input shafts are coaxial with the planetary gearing output shaft, and wherein the planetary gearing output shaft is associated with a door shaft for movement of the door, and wherein the door operator is configured to, by control of rotations of the first and second planetary gearing input shafts, to control the planetary gearing gear ratio and thus an angular velocity and a torque delivered by the planetary gearing output shaft, wherein the door operator is configured to be mounted as a unit on one side of the door, and wherein the method comprises:

receiving an activation request by the control unit, determining, by the control unit based on current operating conditions, an operating mode of the door operator, wherein a first operating mode comprises rotating the first and second planetary gearing input shafts in the same direction and with essentially the same speed, a second operating mode comprises holding one of the first and second planetary gearing input shafts stationary while another of the first and second planetary gearing input shafts rotates, and a third operating mode comprises rotating the first and second planetary gearing input shafts in the opposite direction in relation to one another, wherein the first operating mode is used to provide a high torque and slow speed, and the second operating mode is used to provide an intermediate speed and the third mode to achieve a highest speed, and wherein the operating conditions comprises a current position of the door, a desired movement direction of the door, a velocity of the door, or a load on the output shaft, and controlling, by the control unit energizing the first and second motors, the rotation of the first and second planetary gearing input shafts based on the determined operating mode, wherein the first to third operating modes are used during an opening sequence of the door, wherein the first mode is used to initiate the opening of the door when the door is in a vertical and closed end position, the second mode is used as an intermediate mode to accelerate the door once partially open, and the third mode is used to achieve a high opening speed of the door when the door has attained sufficient speed in the second mode.

11. The method for controlling the door operator according to claim 10, wherein the door operator is configured to slow the opening sequence once the door approaches an open horizontal end position by going from the third mode, to the second mode and to the first mode.

12. Overhead door system wherein the door is moveable between an open and a closed position by means of the door operator according to claim 1.

13. Door operator for an overhead door system, said door operator being configured to move a door of said door system, the door operator comprising:

a first electric motor, a second electric motor, a planetary gearing, a control unit configured to control the first and second electric motor, and wherein the first electric motor is connected to a first planetary gearing input shaft and the second electric motor is connected to a second planetary gearing input shaft, wherein a planetary gearing output shaft is associated with a door shaft for movement of the door, wherein the door operator is configured to, by control of rotations of the first and second planetary gearing input shafts, to control the planetary gearing gear ratio and thus an angular velocity and a torque delivered by the planetary gearing output shaft, wherein the first planetary gearing input shaft is connected to a planet carrier of the planetary gearing, wherein the second planetary gearing input shaft extends inside the door shaft, and wherein the planetary gearing is arranged between the first and second electric motors.

14. Door operator according to claim 13, wherein the door operator is configured to be mounted with the first electric motor and the planetary gearing on one side of the door and the second electric motor on the other side of the door.

* * * * *